United States Patent
Arai et al.

(10) Patent No.: US 9,080,223 B2
(45) Date of Patent: Jul. 14, 2015

(54) STEEL TUBE FOR AIRBAGS AND A PROCESS FOR MANUFACTURING SAME

(75) Inventors: Yuji Arai, Amagasaki (JP); Takashi Takano, Wakayama (JP); Takuma Kawamoto, Wakayama (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/438,956

(22) Filed: Apr. 4, 2012

(65) Prior Publication Data

US 2012/0205016 A1 Aug. 16, 2012

Related U.S. Application Data

(63) Continuation of application No. PCT/JP2010/059417, filed on Jun. 3, 2010.

(51) Int. Cl.

| | | |
|---|---|---|
| *C22C 38/54* | (2006.01) | |
| *C21D 9/08* | (2006.01) | |
| *C21D 7/10* | (2006.01) | |
| *C21D 1/26* | (2006.01) | |
| *C21D 8/10* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/48* | (2006.01) | |
| *C22C 38/50* | (2006.01) | |
| *C21D 1/32* | (2006.01) | |
| *C21D 1/42* | (2006.01) | |

(52) U.S. Cl.
CPC .. *C21D 7/10* (2013.01); *C21D 1/26* (2013.01); *C21D 8/10* (2013.01); *C21D 9/085* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/48* (2013.01); *C22C 38/50* (2013.01); *C22C 38/54* (2013.01); *C21D 1/32* (2013.01); *C21D 1/42* (2013.01)

(58) Field of Classification Search
USPC .......................... 148/330, 333–336, 520, 593
See application file for complete search history.

(56) References Cited

U.S. PATENT DOCUMENTS

| 6,878,219 B2 * | 4/2005 | Kondo et al. | 148/333 |
|---|---|---|---|
| 2006/0169368 A1 * | 8/2006 | Lopez et al. | 148/332 |
| 2008/0314481 A1 * | 12/2008 | Garcia et al. | 148/519 |

FOREIGN PATENT DOCUMENTS

| CA | 2 525 062 | 11/2005 |
|---|---|---|
| CA | 2 585 629 | 5/2006 |
| JP | 10-212549 | 8/1998 |

(Continued)

*Primary Examiner* — Deborah Yee
(74) *Attorney, Agent, or Firm* — Clark & Brody (57) ABSTRACT

A steel tube for an airbag which has a low alloy cost and a strength of at least 1000 MPa and vTrs100 of −80° C. or below and a process for its manufacture which can minimize the number of times that softening annealing treatment is performed in a cold drawing step are provided. Stable properties are obtained even when quench hardening is carried out by high frequency induction heating on a large scale. The steel tube has a steel composition which comprises, in mass percent, C: 0.05-0.20%, Si: 0.10-0.50%, Mn: 0.10-1.00%, P: at most 0.025%, S: at most 0.005%, Al: 0.005-0.10%, Ca: 0.0005-0.0050%, Nb: 0.005-0.050%, Ti: 0.005-0.050%, Cu: 0.01-0.50%, Ni: 0.01-0.50%, Cr: 0.01-0.50%, B: 0.0005-0.0050%, N: 0.002-0.010%, and a remainder of Fe and unavoidable impurities.

6 Claims, 1 Drawing Sheet (56) References Cited

FOREIGN PATENT DOCUMENTS

| | | |
|---|---|---|
| JP | 2004-076034 | 3/2004 |
| JP | 2010-132999 | 6/2010 |
| WO | 02/079526 | 10/2002 |
| WO | 2004/104255 | 12/2004 |
| WO | 2006/046503 | 5/2006 |

* cited by examiner

| A | 8 | mm |
| B | 30 | mm |
| C | 40 | mm |
| D | 110 | mm |
| E | 30 | mm |

US 9,080,223 B2

STEEL TUBE FOR AIRBAGS AND A PROCESS FOR MANUFACTURING SAME

TECHNICAL FIELD

This invention relates to a steel tube for an airbag having a high strength with a tensile strength of at least 1000 MPa and a high toughness expressed by vTrs100 of −80° C. or below. It also relates to a process for manufacturing the steel tube.

More specifically, this invention relates to a steel tube for an airbag which can be manufactured by a relatively inexpensive and simple process and which can employ quench hardening heat treatment for a short period of time which utilizes a rapid heating means such as high frequency induction heating and to process for manufacturing the steel tube.

BACKGROUND ART

In recent years, in the automotive industry, the introduction of devices aimed at increasing safety is being actively promoted. Such devices includes airbag systems, which have been developed and mounted on vehicles. An airbag system is a system which at the time of an automotive collision expands an airbag with gas or the like between a passenger and the steering wheel, the instrument panel, or other object before the passenger strikes these objects in order to absorb the kinetic energy of the passenger and reduce their injuries. In the past, airbag systems have used explosive chemicals, but in recent years, airbag systems which use a high pressure filler gas have been developed and are being increasingly used.

The above-described system using a high pressure filler gas always maintains a gas at a high pressure, and at the time of a collision, the high pressure gas is discharged into an airbag all at once. Accordingly, stress is applied to a steel tube used as an accumulator for the high pressure gas at a high strain rate in an extremely short period of time. Therefore, in contrast to a conventional pressure cylinder or a line tube which is a mere structural component, the above-described steel tube is required to have a high strength and excellent bursting resistance as well as good dimensional accuracy, workability, and weldability.

Recently, ultrahigh strength seamless steel tubes having a tensile strength greater than 1000 MPa are being used as accumulators for airbag systems in order to guarantee a high bursting pressure even when the wall thickness and the weight of the accumulators are reduced. For example, whereas the bursting pressure of an accumulator made from a seamless steel tube having an outer diameter of 60 mm and a wall thickness of 3.55 mm is only around 100 MPa when TS is 800 MPa, the bursting pressure increases to 130 MPa when TS becomes 1000 MPa. Furthermore, when the outer diameter of a steel tube for an accumulator of an airbag and the required bursting pressure are fixed, it is possible to decrease the wall thickness by around 20%.

An accumulator also needs to have excellent low temperature toughness so that the accumulator will not undergo brittle fracture and cause a secondary accident at the time of a collision even in cold regions.

From this viewpoint, a seamless steel tube for an accumulator has been imparted a high strength and high toughness by quench hardening and tempering. Specifically, after an accumulator has undergone the below-described diameter reduction, it is required that it have sufficient low temperature toughness in a temperature range of −60° C. or below.

An airbag accumulator is typically formed by cutting a seamless steel tube which is a blank tube to be processed to a prescribed length to obtain a short tube, subjecting at least one end of the short tube to diameter reduction by working such as press forming or spinning (this step is referred to as bottle forming), and finishing the short tube to a final shape necessary for mounting on an initiator or the like. Accordingly, in order to guarantee operation of an accumulator for an airbag, the toughness of the seamless steel tube used as a blank tube is sometimes inadequate. This is because the toughness of the bottle-shaped portion of the resulting accumulator decreases due to the final working for diameter reduction, whereby cracks may develop in that portion when a high pressure is applied to the accumulator. Taking into consideration such a decrease in toughness, a seamless steel tube used in the manufacture of airbag accumulators needs to have toughness at a lower temperature than the temperature of the environment of use of an accumulator.

From this standpoint, a seamless steel tube used to constitute an accumulator is required to have elongation of at least 10%, a tensile strength of at least 1000 MPa, and low temperature toughness such that fracture appearance is ductile in a Charpy impact test at −80° C. and preferably at −100° C. (namely, it has low temperature toughness such that vTrs100 is −80° C. or below and preferably −100° C. or below).

Patent Document 1 is an example of prior art relating to a seamless steel tube for an airbag system having a high strength with a tensile strength of at least 1000 MPa and high toughness. Patent Document 1 proposes a process for manufacturing a seamless steel tube for airbags comprising producing a seamless steel tube using a steel having a chemical composition in a certain range, subjecting the seamless steel tube to cold drawing to obtain a steel tube with predetermined dimensions, quench hardening the steel tube after heating to a temperature in the range of at least the $Ac_3$ transformation point to at most 1050° C., and performing tempering of the tube at a temperature in the range of at least 450° C. to at most the $Ac_1$ transformation point.

It is purported in that document that this process can provide a seamless steel tube having excellent workability and weldability at the time of manufacture of an inflator for an airbag, which has a tensile strength of at least 900 MPa as an inflator, and which has high toughness such that the steel tube exhibits ductility when it is cut in half and subjected to a drop weight test at −60° C. However, in order to obtain such a strength and toughness, it is necessary to employ a steel with composition containing a large amount of Cr, so this process is expensive.

Patent Document 2 discloses that if quench hardening by high frequency induction heating is used, it is possible to manufacture a seamless steel tube for an airbag system having a high strength with a tensile strength exceeding 1000 MPa and a high toughness due to grain refinement caused by the rapid heating.

With that technique, after a seamless steel tube is manufactured using a steel having a chemical composition in a prescribed range, the seamless steel tube is then subjected to cold drawing to obtain a steel tube with prescribed dimensions, then to heating to 900-1000° C. at a heating rate of at least 10° C. per second, to quenching, and to tempering at a temperature not higher than the $Ac_1$ transformation point. This technique is intended to achieve a high toughness such that ductility is exhibited in a burst test at −80° C. or below. In Patent Document 2, a specific example is given of heating at a rate of 20° C. per second for quench hardening. However, taking into consideration industrial productivity, it is desirable to perform rapid heating in a shorter period of time and to shorten the holding time at the temperature which is reached. When performing heat treatment with rapid heating in a short period of time and a short holding time, the temperature which is reached may locally fall below the $Ac_3$ point due to variations in the heating temperature. Therefore, if possible, it is desirable to set the heating temperature on the high side. However, with high frequency induction heating, due to rapidness of heating, the problem of overshooting in which heating temperature is beyond the set temperature may occur. For this reason, it is necessary to take into consideration the case in which the temperature which is reached during high frequency induction heating for quenching exceeds 1000° C. However, Patent Document 2 says nothing about this problem which occurs during mass production. Rather, it states that a temperature in excess of 1000° C. leads to coarsening of gamma (γ) grains and a decrease in toughness.

Patent Document 3 discloses examples in which high frequency induction heating is employed for quench hardening. However, as shown in Table 3 of the examples of that document, only heating for a short period of time in the range of 900-1000° C. is contemplated. Thus, the technique disclosed in this document has the same problems as discussed for Patent Document 2.

Patent Document 4 discloses quench hardening by high frequency induction heating, but the examples are the result of heating in the range of 920-940° C., so the technique disclosed in this document has the same problems as discussed for Patent Document 2.

PRIOR ART DOCUMENTS

Patent Documents

Patent Document 1: JP 2004-76034 A
Patent Document 2: WO 2004/104255 A1
Patent Document 3: WO 2002/079526 A1
Patent Document 4: US 2006/0169368 A1

SUMMARY OF THE INVENTION

Thus, a number of seamless steel tubes for airbags have already been proposed in the past, but in recent years, there has been a demand that steel tubes for airbags having a high strength of the grade of 1000 MPa in tensile strength exhibit ductility in a burst test at –60° C. and preferably at –80° C. From the standpoint of increasing the degree of freedom of design in working of a steel tube to form an accumulator, with steel tubes which meet this bursting resistance, the lowest temperature at which 100% ductile fracture is exhibited in a Charpy impact test (vTrs100) is –80° C. or below and preferably –100° C. or below.

In the known prior art documents, cases in which excellent low temperature toughness and bursting resistance as a result of induction hardening (quench hardening with high frequency induction heating) followed by tempering have been ascertained are the cases in which the heating temperature by rapid heating with high frequencies was in the range of 900-1000° C. The lower is the wall thickness of a steel tube, the larger are fluctuations in the heating temperature in mass production by actual induction hardening. In this case, the heating temperature becomes too low or higher than 1000° C., and there is the problem of a decrease in yield due to a decrease in the stability of the performance of a product which could not be predicted by the prior art.

For example, according to the findings of the present inventors, since the steel tube in Patent Document 1 contains a large amount of Cr, it has the problems that its cold drawability is insufficient. In order to achieve a high working ratio in a cold drawing stage, it is necessary to perform intermediate softening annealing a number of times, so manufacturing costs increase. In addition, the fact that ductility is exhibited in a drop weight test at –60° C. does not necessarily mean that ductility is exhibited in a burst test at –60° C.

It is desirable to simplify manufacturing steps in order to efficiently carry out mass production. In the known prior art documents, the sum of the contents of Cr and Mo in the steel composition is mostly greater than 0.6%. If a seamless steel tube contains such a large amount of Cr and Mo, its strength becomes high due to air cooling after manufacture of the seamless steel tube in a hot state, and cold drawing becomes difficult. As a result, softening annealing before cold drawing becomes necessary, and a manufacturing process becomes complicated, thereby increasing the manufacturing costs.

Although they are not mentioned in the above-described patent documents, there are many examples of steel tubes for air bags which do not contain Cr or Mo or in which the total content of these elements is suppressed to a low level of at most 0.6%. However, in such known examples of steel compositions, there are no examples in which while having a tensile strength of at least 1000 MPa, the lowest temperature for 100% ductile fracture (vTrs100) is –80° C. or below or ductile fracture is exhibited in a burst test at –60° C. There are examples having a strength exceeding 1000 MPa in these prior art documents, but in these examples, it is not possible to simultaneously obtain such a high tensile strength and excellent low temperature toughness in a stable manner.

The object of the present invention is to provide a steel tube for an airbag which has the properties currently demanded of an accumulator for an airbag, namely, the ability to adequately cope with increases in accumulator pressure and decreases in the wall thickness of a steel tube, which is inexpensive, and which has good applicability of quench hardening by high frequency induction heating on a scale performed in mass production. It is also an object to provide a process for manufacturing this steel tube.

More specific technical objects of the present invention are as follows.

(I) There is a desire for a steel tube for an airbag which as a final product has a tensile strength of at least 1000 MPa and preferably at least 1050 MPa and which has excellent low temperature toughness such that it exhibits ductile fracture in a burst test at –60° C. and which in particular has the lowest temperature for 100% ductile fracture (vTrs100) being –80° C. or below and preferably –100° C. or below. This will be referred to as technical object (I).

(II) There is a desire for a steel tube described above in (I) which suppresses alloy costs, and particularly which decreases as much as possible the use of Mo, which has been much used in the past with the object of increasing strength. This will be referred to as technical object (II).

(III) For the steel tube described above in (I), there is a desire for an alloy design which can minimize the number of times that softening annealing is carried out in a cold drawing step. More specifically, there is a desire for an alloy design having good cold workability such that a working ratio of at least 40% can be realized without carrying out intermediate softening annealing in a cold drawing step of a tube. This will be referred to as technical object (III).

(IV) As a more preferred mode, there is a desire for an alloy design which can manufacture the steel tube described above in (I) in a state in which properties are stably obtained by quenching with high frequency induction heating on a mass production scale. More specifically, there is a desire for a process of manufacturing a steel tube for an airbag which can provide a product having a high toughness of at least a prescribed level even when the heating temperature for quench hardening exceeds 1000° C. (such as 1020-1040° C.). This will be referred to as technical object (IV).

In order to achieve the above-described objects, the present inventors investigated the relationship between alloying elements, strength, and low temperature toughness in a seamless steel tube for an airbag system which is subjected to quench hardening and tempering after cold working. As a result, they unexpectedly found that contrary to existing knowledge, a balance between excellent strength and toughness which are currently desired is obtained by a steel which contains a low level of Mn and a limited amount of Cr, which up to now has been added in a large amount, and which contains suitable amounts of Cu, Ni, Ti, and B, even if Mo is not added.

Namely, the present inventors studied the effect of alloying elements on the strength and toughness of a seamless steel tube for an airbag system which is manufactured by carrying out quench hardening and tempering after cold working and which has a TS exceeding 1000 MPa. As a result, they obtained the following knowledge and completed the present invention.

(i) They found that in order to simultaneously achieve the above-described objects (I), (II), and (III), it is effective to contain suitable amounts of C, Si, Mn, Al, Ca, Nb, Ti, and B; to limit the amount of Cr, which up to now has been added in a large amount for the purpose of obtaining a high strength, to at most 0.5% without addition of Mo (if necessary a small content of less than 0.1% Mo is permissible) and instead to make the contents of Cu and Ni each 0.01-0.50% with the total content of Cu and Ni being at least $\{(Cr+Mo)^2+0.3\}$.

(ii) They also found that when the heating temperature at the time of rapid heating for quench hardening reaches 1040° C., for example, which is higher than the upper limit for the target range (1000° C.), namely, with respect to above-described object (IV), it is possible to simultaneously achieve the above-described target strength and toughness by containing Ti in an amount of greater than 0.02% and at most 0.05%.

The present invention was completed based on the above findings and further investigations.

In brief, the present invention is as follows.

(1) A seamless steel tube for an airbag system characterized by having a steel composition which comprises C: 0.05-0.20%, Si: 0.10-0.50%, Mn: 0.10-1.00%, P: at most 0.025%, S: at most 0.005%, Al: 0.005-0.10%, Ca: 0.0005-0.0050%, Nb: 0.005-0.050%, Ti: 0.005-0.050%, Cu: 0.01-0.50%, Ni: 0.01-0.50%, Cr: 0.01-0.50%, B: 0.0005-0.0050%, N: 0.002-0.010%, and a remainder of Fe and unavoidable impurities, and which satisfies the following Equation (1), the steel tube having a tensile strength of at least 1000 MPa and a high toughness such that vTrs100 is −80° C. or below.

$$Cu+Ni \geq (M)^2+0.3 \quad (1)$$

In Equation (1), M indicates Cr, and the symbols for elements indicate the contents of these elements in mass percent.

(2) A steel tube for an airbag as set forth in (1) characterized by having a steel composition in which the Ti content in mass percent is greater than 0.020% and at most 0.050%.

(3) A seamless steel tube for an airbag as set forth in (1) or (2) characterized by having a steel composition further containing less than 0.10 mass % of Mo and satisfying the following Equation (1).

$$Cu+Ni \geq (M)^2+0.3 \quad (1)$$

In Equation (1), M indicates (Cr+Mo), and the symbols for elements indicate the contents of those elements in mass percent. When the content of Mo is zero, zero is substituted for Mo in Equation (1).

(4) A seamless steel tube for an airbag system as set forth in any of (1)-(3) characterized by having a steel composition which further contains 0.02-0.20% of V.

(5) A process for manufacturing a seamless steel tube for an airbag characterized in that a seamless steel tube produced by hot tube forming using a billet having a steel composition as set forth in any of (1)-(4) is subjected to cold working with the working ratio in one occurrence of cold working being at least 40% to form a steel tube having prescribed dimensions, if desired, followed by straightening of the tube, and the steel tube is then subjected to quench hardening by heating to a temperature of at least the $Ac_3$ transformation point by means of high frequency induction heating followed by rapid cooling and then subjecting to tempering by heating to a temperature of at most the $Ac_1$ transformation point.

The present invention can provide a seamless steel tube having an extremely high strength and excellent bursting resistance at low temperatures. Therefore, the present invention markedly contributes to an increase in the pressure (a pressure of at least 145 MPa) and a decrease in the wall thickness (such as a seamless steel tube with a wall thickness of 3.6 mm-1.7 mm and a diameter of 60.3 mm-25.0 mm) of an airbag accumulator having an end which has undergone diameter reduction.

MODES FOR CARRYING OUT THE INVENTION

The reasons for the limitations on the chemical composition of a steel tube according to the present invention and on a manufacturing process for the steel tube will be described below.

(A) Chemical Composition of the Steel

In this description, unless otherwise specified, % means mass %.

C: 0.05-0.20%

C is an element which is effective at inexpensively increasing the strength of steel. When its content is less than 0.05%, it is difficult to obtain a desired tensile strength of at least 1000 MPa, while if its content exceeds 0.20%, workability and weldability decrease. Accordingly, the C content is made 0.05-0.20%. A preferred range for the C content is 0.07-0.17%.

Si: 0.10-0.50%

Si is an element which has a deoxidizing action and which increases the hardenability of steel thereby increasing its strength. Therefore, the Si content needs to be at least 0.10%. However, toughness decreases if its content exceeds 0.50%, so the Si content is made 0.10-0.50%. A preferred range for the Si content is 0.20-0.50%.

Mn: 0.10-1.00%

Mn is an element which has a deoxidizing action and which is effective at increasing the hardenability of steel thereby increasing its strength and toughness. However, if its content is less than 0.10%, sufficient strength and toughness are not obtained, while if its content exceeds 1.00%, it produces coarsening of MnS, leading to a decrease in toughness because of extension of MnS occurring during hot rolling. In the present invention, it is necessary to guarantee a target tensile strength of at least 1000 MPa and excellent low temperature bursting resistance even when Mn is suppressed to at most 1.00%, and as described below, improvement of hardenability is achieved by adding B. Therefore, the content of Mn is made 0.10-1.00%. The Mn content is preferably 0.40-0.90% from the standpoint of a balance between strength and toughness.

P: at most 0.025%

P brings about a decrease in toughness caused by grain boundary segregation. The decrease in toughness becomes particularly marked when its content exceeds 0.025%. Accordingly, the P content is made at most 0.025%. The P content is preferably at most 0.020%, and it is still more preferably at most 0.015%.

S: at most 0.005%

S decreases toughness particularly in the T direction of a steel tube, namely, in the direction perpendicular to the rolling direction (lengthwise direction) of a steel tube. If its content exceeds 0.005%, the decrease in toughness in the T direction of the steel tube becomes particularly marked. Accordingly, the S content is made at most 0.005%. The S content is preferably at most 0.003%.

Al: at least 0.005% and at most 0.10%

Al is an element which has a deoxidizing action and which is effective at increasing toughness and workability. However, if it is contained in excess of 0.10%, the occurrence of sand marks becomes marked. Accordingly, the Al content is made at most 0.10%. In order to obtain these effects of Al, it is necessary to contain at least 0.005%. The Al content in the present invention is indicated by the content of acid-soluble Al (referred to as sol. Al).

Ca: 0.0005-0.0050%

Ca fixes S, which is present in steel as an unavoidable impurity, as a sulfide, thereby improving the anisotropy of toughness and increasing toughness in the T direction of a steel tube. As a result, it has the effect of increasing bursting resistance. This effect is exhibited when its content is at least 0.0003% and particularly at least 0.0005%. However, if it is contained in excess of 0.0050%, inclusions increase, and toughness ends up decreasing. Accordingly, the Ca content is made 0.0005-0.0050%.

Nb: 0.005-0.050%

Nb is finely dispersed in steel as carbides and is effective at strongly pinning grain boundaries. As a result, it has the effect of refining crystal grains and thereby increasing the toughness of steel. In order to obtain this effect, its content is made at least 0.005%, but if it is contained in excess of 0.050%, carbides coarsen and toughness ends up decreasing. Accordingly, the Nb content is made 0.005-0.050%.

Ti: 0.005-0.050%

Ti fixes N in steel and has the effect of increasing toughness. In addition, finely dispersed Ti nitrides have the effects of strongly pinning grain boundaries, refining crystal grains, and increasing the toughness of steel. Fixing of N in steel is also important in deriving the below-described effect of B. Accordingly, in order to obtain these effects, at least 0.005% of Ti is contained. However, if it is contained in excess of 0.050%, nitrides coarsen and toughness ends up decreasing. Accordingly, the Ti content is made 0.005-0.050%. In particular, when quench hardening is carried out by rapid heating, crystal grains easily coarsen due to an excessive heating temperature leading to a decrease in toughness, so it is desirable to sufficiently utilize the effect of Ti nitrides on pinning of crystal grain boundaries. For this reason, a preferred Ti content is greater than 0.020% to 0.035%.

B: 0.0005-0.0050%

B segregates at grain boundaries in steel, thereby markedly improving the hardenability of steel and contributing to increasing its toughness. These effects are exhibited when its content is made at least 0.0005%. However, if it is contained in excess of 0.0050%, borides coarsely precipitate at grain boundaries, and toughness ends up decreasing. Accordingly, the B content is made 0.0005-0.0050%. Preferably, it is at most 0.0030%.

In the present invention, as the upper limit on the Mn content is limited to 1.0%, strength is increased by improving hardenability due to the addition of B.

If B is not in a solid solution, it does not segregate at grain boundaries. Accordingly, N, which easily forms a compound with B, is preferably fixed by Ti, and B is preferably contained in at least an amount which is fixed by N. From this viewpoint, the Bi content preferably satisfies the relationships given by the following Equations (2) or (3) based on the stoichiometric ratios of B, Ti, and N.

When N—Ti/3.4≤0, then $$B \geq 0.0005 \tag{2}$$

When N—Ti/3.4≥0, then $$B-(N-Ti/3.4)\times(10.8/14) \geq 0.0005 \tag{3}$$

In Equation (2), B, N, and Ti indicate the contents in mass percent of those elements.

N: 0.002-0.010%

N is an impurity which is unavoidably present in steel. However, in the present invention, it is important to control the N content so as to disperse it by forming nitrides with Ti and fully utilize the effect of the resulting nitrides on pinning of grain boundaries. In order to exhibit this effect, the N content is made at least 0.002%. However, if the content of N is excessive, solid solution N increases and it forms a compound with B, leading to a decrease in the amount of solid solution B. Accordingly, the upper limit on the N content is made at most 0.010%. A preferred range for the N content is 0.002-0.008%.

In a steel according to the present invention, the Cr content is decreased, and even if Mo is added, Mo is limited to an extremely small amount, with Cu and Ni being added. Therefore, even if B is added, precipitation of carboborides with Cr and Mo is suppressed, which is desirable from the standpoints of improving strength and toughness.

Cu: 0.01-0.50%

Cu has the effects of increasing the hardenability of steel and thereby increasing its strength and toughness. These effects are exhibited if its content is at least 0.01% and preferably at least 0.03%. However, containing Cu in excess of 0.50% leads to a marked increase in alloy costs. Accordingly, the Cu content is made 0.01-0.50%. A preferred content is at least 0.03% and particularly at least 0.05%. More preferably, it is at least 0.15%.

Ni: 0.01-0.50%

Ni has the effects of increasing the hardenability of steel and thereby increasing its strength and toughness. This effect is produced when its content is at least 0.01% and preferably at least 0.03%. However, a Ni content exceeding 0.50% leads to excessively high alloy costs. Accordingly, the Ni content is made 0.01-0.50%. A preferred Ni content is at least 0.03% and particularly at least 0.05%, and more preferably at least 0.15%.

Cr: 0.01-0.50%

Cr has the effect of increasing the hardenability of steel and also increasing its resistance to temper softening, thereby increasing strength and toughness. These effects are exhibited when the content of this element is at least 0.01%. However, a Cr content exceeding 0.50% is unsuitable because it leads to excessive strength at the time of cold drawing and decreases workability. Accordingly, the Cr content is 0.01-0.50%. Preferably it is 0.18-0.40%.

The balance among the contents of Cu, Ni, Cr, and Mo is limited as described below.

Limits on the contents of Cu, Ni, Cr, and Mo given by equation:

In the present invention, when Mo is added, the contents of Cu, Ni, Cr, and Mo preferably satisfy the following relationship.

Cr and Mo obstruct spheroidization of cementite which precipitates at the time of tempering. In addition, in a steel which contains B as in the present invention, these elements easily form boron compounds (borides) at grain boundaries, leading to a decrease in toughness particularly with a high strength material. Therefore, for a high strength and high toughness steel tube for an airbag, which is the object of the present invention, it is more suitable to increase strength by adding Cu or Ni rather than achieving an increase in strength by containing Cr (with limiting Mo to an extremely small amount when Mo is added). Specifically, it is important for the balance of the contents of Cr, Mo, Cu, and Ni to satisfy the following Equation (1).

$$Cu+Ni \geq (M)^2 + 0.3 \qquad (1)$$

M in Equation (1) indicates Cr+Mo, and the symbol for each element indicate the content in mass percent of such element. When Mo is not contained, zero is substituted for Mo in Cr+Mo.

The following elements need not be contained, but they may be contained as necessary.

Mo: less than 0.10%

As a rule, Mo is not contained in the present invention, but if desired, an extremely small amount of Mo may be contained. Mo has the effect of increasing the hardenability of steel and increasing its resistance to temper softening, thereby increasing strength and toughness. These effects can be observed even with an extremely small amount, but in order to obtain these effects with certainty, it is preferable to contain at least 0.01% of Mo. However, containing 0.10% or more of Mo leads to excessive alloy costs. Furthermore, if the Mo content is high, in air cooling after hot tube forming of a seamless steel tube, there is a tendency for the strength to increase, and softening annealing before cold drawing becomes necessary, leading to an increase in manufacturing costs. Accordingly, when Mo is added, the Mo content is made less than 0.10%.

V: 0.02-0.20%

V has the effect of increasing the strength of steel by precipitation strengthening. This effect of V is exhibited when its content is at least 0.02%, but toughness decreases when its content exceeds 0.20%. Accordingly, the content of V when it is added is made 0.02-0.20%. A preferred range for the V content is 0.03-0.10%.

Next, the reasons for the limitations on the manufacturing process for a seamless steel tube according to the present invention will be described.

(B) Starting Material

In the present invention, there are no particular limitations on a steel block which is a starting material for a steel tube. It may be a cast member which is cast by a continuous casting machine having a column-shaped mold, or it may be cast into a rectangular mold and then formed into the shape of a column by hot forging. In a steel according to the present invention, the addition of Cr (or Cr and Mo when Mo is added), which is a ferrite-stabilizing element, is suppressed, and Cu and Ni, which are austenite-stabilizing elements, are added. Therefore, even when continuous casting is carried out to form a round CC billet, the present invention has a significant effect of preventing centerline cracks of the billet, and it is possible to employ a round CC billet as a starting material.

If there are many cracks in the center of a round CC billet, during straightening of a seamless steel tube which is carried out after cold working and particularly cold drawing of a mother tube, the cracks are extended and they sometimes result in the formation of cracks originating from the inner surface when final working for diameter reduction is carried out on the tube after induction hardening and tempering. Accordingly, the steel composition according to the present invention is suitable for a seamless steel tube for an airbag accumulator particularly when using a round CC billet as a starting material.

(C) Hot Tube Forming

In the present invention, a steel tube can be manufactured using the billet described in (B) having its chemical composition adjusted in the above-described manner as a starting material, and there are no particular limitations on a method of manufacturing the steel tube. For example, the Mannesmann-mandrel method can be used.

(D) Cold Working

A steel tube in the form of a seamless steel tube which is manufactured in the above-described manner undergoes cold working under conditions providing a prescribed dimensional accuracy and surface conditions. Cold working can be any type which can provide a prescribed dimensional accuracy and surface conditions. Therefore, it is not necessary to limit the cold working method to a specific method such as cold drawing, cold rolling, or the like. The working ratio is preferably at least 3% in the term of reduction of area (percent decrease in cross section). It is preferably less than 50% since if it exceeds 50%, there is typically marked occurrence of wrinkles on the inner surface. Cold working is sometimes performed multiple times to obtain the dimensions of a final product. However, the smaller the wall thickness becomes, namely, the higher the working ratio, the greater is the increase in the strength of the steel tube due to work hardening. As a result, it becomes easier for cracks to occur during working, and it becomes necessary to perform intermediate heat treatment for the purpose of softening. By using a steel with a chemical composition limited as in (A), the strength of the mother tube is low, and the strength does not become excessively high during cold working. Therefore, softening heat treatment before cold working can be omitted, which is advantageous. A steel according to the present invention can achieve a working ratio with a reduction of area of at least 40% and preferably greater than 40% without carrying out preliminary softening or intermediate softening annealing.

In the present invention, the reduction of area is the same as the percent decrease in cross section and is defined by the following equation.

$$\text{Reduction of area } (\%) = (S_0 - S_f) \times 100 / S_0$$

$S_0$: Cross-sectional area of the steel tube before cold working $S_f$: Cross-sectional area of the steel tube after the completion of cold working When working is carried out a plurality of times without intermediate softening annealing, the overall reduction of area is made the above-described reduction of area for cold working. Of course, the present invention does not exclude cold working carried out with intermediate softening annealing.

(E) Straightening

Since the present invention is intended to provide a seamless steel tube having a tensile strength exceeding 1000 MPa and having dimensional accuracy, a surface condition, and low temperature toughness necessary for an airbag system, the strength after cold drawing has a tendency to become higher than with a conventional steel, and there is the possibility of the steel tube bending due to springback, for example. If the steel tube undergoes bending, there is concern of the steel tube not passing straight through the high frequency coil at the time of the below-described quench hardening with high frequency induction heating. Accordingly, in a preferred mode, prior to quench hardening by high frequency induction heating, straightening is carried out on the tube which underwent cold working (such as cold drawing).

There are no particular limitations on a straightening method, but a method is preferably employed in which four roll stands of the two-roll type are provided, the centers of the roll gaps of each stand are deviated with respect to each other (namely, they are offset), the roll gaps are adjusted, and a steel tube is bent back and forth by passing through the roll gaps.

The higher the working ratio when bending back and forth, the greater is the straightening effect. Therefore, it is preferred to make the offset at least 1% of the outer diameter of the steel tube with the roll gap being made at most 1% of the outer diameter of the steel tube. The offset is advantageously made at most 50% of the outer diameter of the steel tube with the roll gap being made at least 5% of the outer diameter of the steel tube in order to prevent problems such as the occurrence of wrinkles on the inner surface of the steel tube (F) Heat Treatment After the above-described straightening (E), heat treatment is carried out on the steel tube so as to guarantee the necessary strength of the steel tube and increase toughness in the T direction sufficiently to guarantee bursting resistance. In order to provide a steel tube with a high strength of at least 1000 MPa in tensile strength along with bursting resistance, heat treatment is carried out by heating to a temperature no lower than the $Ac_3$ transformation point followed by rapid cooling and then tempering at a temperature no higher than the $Ac_1$ transformation point.

If the heating temperature before rapid cooling is less than the $Ac_3$ transformation point at which a single austenitic phase is formed, it is not possible to guarantee good toughness in the T direction (and accordingly good bursting resistance). On the other hand, if the heating temperature is too high, austenite grains easily begin to rapidly grow into coarse grains, resulting in a decrease in toughness. Therefore, the heating temperature is preferably at most 1050° C. After rapid heating to a temperature of at least the $Ac_3$ transformation point which is in the austenitic region, the temperature is held for a short period of time in order to refine the austenite grain diameter, thereby making it possible to guarantee extremely high toughness.

In order to realize this rapid heating and holding for a short period of time, it is preferable to employ high frequency induction heating from the standpoint of productivity. The speed of heating at this time can be adjusted by the feed speed of the steel tube which passes through the high frequency coil and is preferably at least around 25° C. per second. More preferably it is at least 50° C. per second and still more preferably is at least 100° C. per second.

Cooling after heating to a temperature of at least the $Ac_3$ transformation point is made rapid cooling in order to obtain the desired tensile strength of at least 1000 MPa stably and with certainty and is preferably carried out by rapid cooling such as water quenching. Specifically, the cooling speed in the temperature range of 800-500° C. in rapid cooling is preferably at least 50° C. per second. More preferably it is at least 125° C. per second.

The steel tube which has been rapidly cooled to the vicinity of room temperature is tempered at a temperature no higher than the $Ac_1$ transformation point in order to impart the desired tensile strength of at least 1000 MPa and bursting resistance. If the tempering temperature exceeds the $Ac_1$ transformation point, it becomes difficult to achieve the above-described properties stably and with certainty.

After tempering, bends may be straightened using a suitable straightener or the like by a method such as one described in (E). Even if a mother tube having the steel composition described in (A) is used, it is sometimes not possible to stably guarantee the strength and toughness desired in the present invention if the heating speed and the cooling speed during quenching are inadequate.

As already stated, a seamless steel tube which is tempered in this manner is cut to a prescribed length to obtain a short tube, then at least one end of the short tube undergoes a reduction in diameter by press forming or spinning, and it is finally worked to a shape necessary for mounting of an initiator or the like, before it is used as an airbag accumulator.

EXAMPLES

Example 1

This example illustrated experiments which were performed for the purpose of investigating the relationship between the steel composition and low temperature toughness of materials which were manufactured while simulating the manufacturing conditions for a seamless steel tube.

Six types of steels having the chemical compositions shown in Table 1 were prepared by vacuum melting. After hot rolling, they underwent cold rolling to obtain steel sheets with a thickness of 5 mm (working ratio of 40%). They were then heated by high frequency induction heating to 920° C. at an average rate of temperature increase of 300° C. per second, held at 920° C. for 5 seconds, then quenched by water cooling, and tempered. A No. 14A tensile test piece specified by JIS Z 2201 (diameter of parallel portion: 4 mm, length of parallel portion: 20 mm) was taken from each sheet which underwent this heat treatment in the direction perpendicular to the rolling direction in order to perform thereon a tensile test in accordance with JIS Z 2241. In the same manner, a V-notch subsize Charpy test piece having a width of 2.5 mm was taken from each heat treated steel sheet in the direction perpendicular to the rolling direction in accordance with JIS Z 2242 to perform thereon a Charpy impact test.

TABLE 1

| Steel No. | C | Si | Mn | P | S | Cu | Ni | Cr | Mo | Ti | Nb | Ca | B | solAl | N |
|---|---|---|---|---|---|---|---|---|---|---|---|---|---|---|---|
| 1 | 0.14 | 0.30 | 0.67 | 0.015 | 0.002 | 0.15 | 0.10 | 0.30 | 0.01 | 0.020 | 0.027 | 0.0022 | 0.0015 | 0.038 | 0.0042 |
| 2 | 0.12 | 0.30 | 0.77 | 0.015 | 0.002 | 0.20 | 0.21 | 0.42 | 0.09 | 0.025 | 0.026 | 0.0020 | 0.0012 | 0.031 | 0.0033 |
| 3 | 0.11 | 0.29 | 0.82 | 0.012 | 0.002 | 0.23 | 0.25 | 0.50 | 0.10 | 0.009 | 0.025 | 0.0020 | 0.0006 | 0.031 | 0.0045 |
| 4 | 0.14 | 0.29 | 0.83 | 0.012 | 0.002 | 0.25 | 0.31 | 0.40 | 0.05 | 0.010 | 0.026 | 0.0022 | 0.0008 | 0.032 | 0.0028 |
| 5 | 0.13 | 0.30 | 0.52 | 0.012 | 0.002 | 0.25 | 0.23 | 0.25 | 0.01 | 0.019 | 0.026 | 0.0023 | 0.0007 | 0.032 | 0.0052 |
| 6 | 0.14 | 0.29 | 0.50 | 0.011 | 0.002 | 0.42 | 0.43 | 0.50 | 0.10 | 0.020 | 0.022 | 0.0023 | 0.0006 | 0.031 | 0.0024 |
| 7 | 0.15 | 0.28 | 0.52 | 0.014 | 0.0013 | 0.24 | 0.26 | 0.31 | 0 | 0.025 | 0.024 | 0.0009 | 0.0013 | 0.032 | 0.0039 |
| 8 | 0.16 | 0.28 | 0.68 | 0.014 | 0.0013 | 0.24 | 0.10 | 0.15 | 0 | 0.025 | 0.024 | 0.0015 | 0.0011 | 0.032 | 0.0044 |

Table 2 shows the tensile strength (TS) of each steel obtained in the tensile test and the lowest temperature of 100% ductile fracture (vTrs100) obtained in the Charpy impact test.

For steels 1-3, TS was adjusted to the vicinity of 1000 MPa by adjusting the tempering temperature, but Equation (1) was not satisfied, so vTrs100 became higher than −80° C. Therefore, although these materials had sufficient toughness in the state in which they were tested, since toughness decreases during working for bottle forming, there is the possibility that a sufficient low temperature bursting resistance can not be obtained.

TABLE 2

| Steel No. | $(Cu + Ni) - (M)^2$ | TS (MPa) | vTrs100 (° C.) |
|---|---|---|---|
| 1 | 0.15 | 1018 | −75 |
| 2 | 0.15 | 1056 | −70 |
| 3 | 0.12 | 1025 | −70 |
| 4 | 0.36 | 1110 | −100 |
| 5 | 0.41 | 1056 | −110 |
| 6 | 0.49 | 1146 | −100 |
| 7 | 0.40 | 1024 | −100 |
| 8 | 0.32 | 1033 | −100 |

Steels 4-8 satisfied Equation (1), so even though TS was at least 1050 MPa, vTrs100 was −100° C. or lower. Therefore, it is predicted that these steels can guarantee sufficient low temperature bursting resistance even if bottle forming is carried out thereon.

Figure 1:
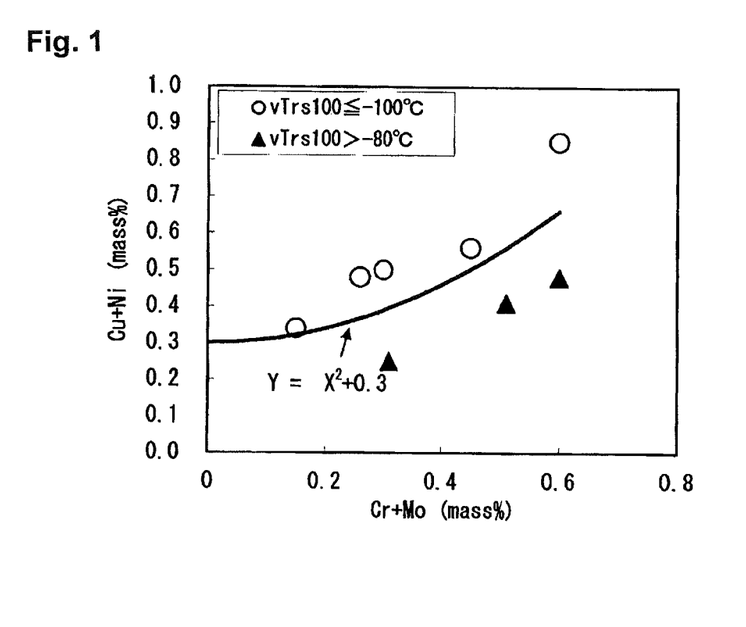
FIG. 1 is a graph showing the relationship between Cr+Mo and Cu+Ni in a preferred mode of the present invention.

FIG. 1 plots the total content of Cr and Mo and the total content of Cu and Ni in each steel of this example. Those examples having vTrs100 of −80° C. or above are marked with a solid triangle (▲), and those having vTrs100 of −100° C. or above are marked with a circle (○). From FIG. 1, it can be seen that excellent low temperature toughness can be achieved by having the total content of Cu and Ni satisfy the relationship to the total content of Cr and Mo given by Equation (1).

$$Cu+Ni \geq (Cr+Mo)^2 + 0.3 \qquad (1)$$

The symbols for elements in Equation (1) indicate the contents in mass percent of those elements. For a steel which does not contain Mo, Mo is made zero.

Example 2

Steels having the chemical compositions shown in Table 3 were prepared by melting in a converter, and round billets having an outer diameter of 191 mm were obtained by continuous casting. After the resulting round CC billets were cut to a desired length, they were heated to 1250° C. and subjected to piercing and rolling by the conventional Mannesmann mandrel mill technique to form a steel tube having an outer diameter of 70 mm and a wall thickness of 4.0 mm.

The resulting seamless steel tubes which were used as mother tubes were subjected to cold drawing in a conventional manner to finish them to an outer diameter of 60.3 mm and a wall thickness of 3.6 mm. These tubes were designated size 1 steel tubes.

The steel tubes which underwent this cold drawing were straightened using a straightener, and then they were heated to 920° C. at an average rate of temperature increase of 300° C. per second using a high frequency induction heating apparatus. After they were held at 920° C. for 5 seconds, they were subjected to water quenching, and then they underwent soaking for 30 minutes in a usual walking beam furnace to carry out tempering.

Straightening of the size 1 steel tubes by a straightener was carried out using three roll stands of the 2-roll type. The central position of the roll gap of the second stand was deviated by 20 mm upward with respect to the central position of the first roll stand, the central position of the roll gap of the third roll stand was deviated by 3 mm upward with respect to the central position of the first roll stand, and the roll gaps of the second roll stand and the third roll stand were adjusted to 58.8 mm (outer diameter—1.5 mm) and 57.3 mm (outer diameter—3.0 mm), respectively. Bending back and forth was carried out by passing the steel tubes through these roll stands.

Likewise, seamless steel tubes which were formed with an outer diameter of 51.0 mm and a wall thickness of 3.0 mm by piercing and rolling were subjected to cold drawing in a conventional manner to finish to an outer diameter of 40.0 mm and a wall thickness of 2.6 mm. They were designated size 2 steel tubes.

The steel tubes which underwent this cold drawing were straightened with a straightener, and then they were heated to 920° C. using a high frequency induction heating apparatus and held for 5 seconds before they were water quenched, and then they underwent soaking for 30 minutes in a usual walking beam furnace to carry out tempering.

Straightening of the size 2 steel tubes by a straightener was carried out in the same manner as for the size 1 steel tubes. The central position of the roll gap of the second roll stand was deviated by 10 mm upward with respect to the central position of the first roll stand, the central position of the roll gap of the third roll stand was deviated by 3 mm upward with respect to the central position of the first roll stand, and the roll gaps of the second roll stand and the third roll stand were adjusted to 39.5 mm (outer diameter—0.5 mm) and 39.2 mm (outer diameter—0.8 mm), respectively. The steel tubes were bent back and forth by being passed through these rolls stands.

Figure 2:
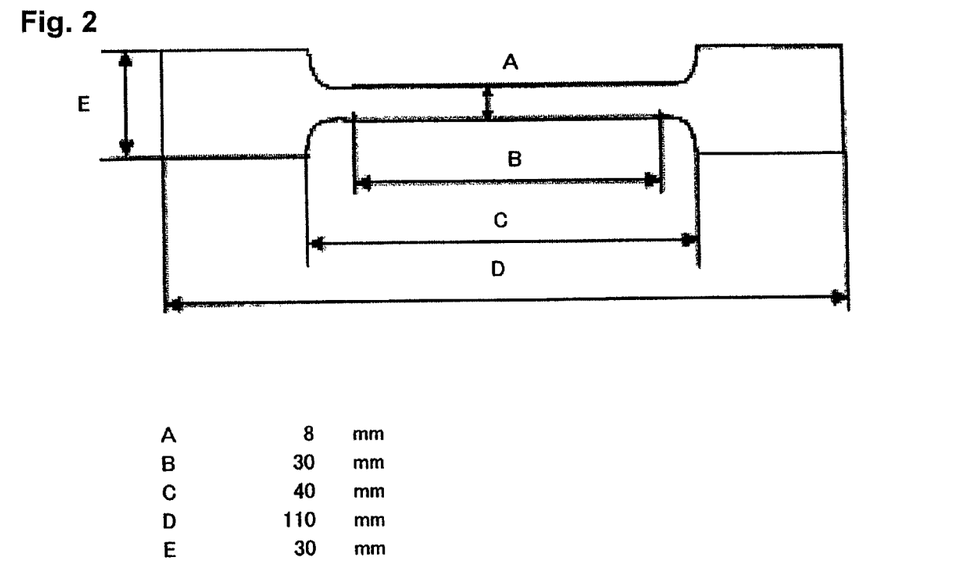
FIG. 2 is an explanatory view of a test piece used to evaluate the properties in examples of the present invention.

A tensile test piece having the shape shown in FIG. 2 was taken from each steel tube which underwent induction hardening and tempering, and its strength properties were investigated. The numbers in FIG. 2 indicate dimensions (mm).

The steel tubes which underwent induction hardening and tempering were each cut into six short tubes having a length of 300 mm, and each cut tube was formed into the bottle shape of an accumulator by carrying out press forming on both ends of the cut tube so as to form a reduced diameter portion having a length of 25 mm on each end of the tube in which the ratio of the diameter of the reduced diameter portion to the diameter of the unreduced portion was 0.6. One end of each tube was sealed by welding, and a closing member through which a high pressure hose passed was welded to the other end of the tube.

While the resulting test specimen was immersed in ethanol inside a chamber which was cooled to −60° C., ethanol was charged into the tube through the high pressure hose until the tube was ruptured by an increased internal pressure, and the mode of failure was observed.

As a result, for all six of the test specimens of each of size 1 and size 2 steel tubes using steels A and B, the percent area of brittle fracture of the rupture surface was less than 5%, and it was ascertained that they had satisfactory bursting properties.

In contrast, of the six test specimens of each of size 1 and size 2 steel tubes using steel C, three specimens prematurely ruptured from the reduced diameter portion, so the bursting pressure was markedly decreased. For all six test specimens of each of the steel tubes using steels D and E, the percent area of brittle fracture of the rupture surface was at least 5%.

The results are shown in Table 4 together with the results of the tensile test.

Steels A and B in Table 4 were steels for which the components satisfied the conditions prescribed by the present invention. Steels C-E were steels which did not satisfy Equation (1) for the relationship among the contents of Cu, Ni, Cr, and Mo which should be satisfied by the present invention, or they were steels which did not satisfy the ranges for other components.

After the steel tubes which underwent cold drawing were straightened with a straightener, they were heated under the conditions shown in Table 6 at an average rate of temperature increase of 300° C. per second using a high frequency induction heating apparatus, and then they underwent water quenching.

The water quenching was carried out by spraying water from nozzles disposed in the shape of a ring, and passing the steel tubes through the ring to cool the outer surface of the steel tubes. The above-described high frequency induction heating apparatus and the water quenching apparatus were connected with each other, and the cooling speed was varied by varying the speed of passage of the steel tubes. The quenched steel tubes were then soaked for 30 minutes in a usual walking beam furnace to carry out tempering so that the tensile strength was adjusted to be at least 1000 MPa.

TABLE 3

| Steel No | C | Si | Mn | P | S | Cu | Ni | Cr | Mo | Ti | V | Nb | Al | B | Ca | N | $Ac_1$ point | $Ac_3$ point |
|---|---|---|---|---|---|---|---|---|---|---|---|---|---|---|---|---|---|---|
| A  | 0.16 | 0.28 | 0.52   | 0.012 | 0.0024 | 0.24 | 0.26 | 0.30 | 0.01 | 0.024 | <0.01 | 0.023 | 0.035 | 0.0009   | 0.0016 | 0.0054 | 740 | 854 |
| B  | 0.14 | 0.29 | 0.80   | 0.012 | 0.0016 | 0.30 | 0.30 | 0.50 | 0.05 | 0.015 |  0.06 | 0.025 | 0.031 | 0.0015   | 0.0020 | 0.0029 | 741 | 857 |
| C* | 0.15 | 0.30 | 0.50   | 0.015 | 0.0016 | 0.10 | 0.10 | 0.48 | 0.10 | 0.023 | <0.01 | 0.025 | 0.038 | 0.0012   | 0.0013 | 0.0048 | 761 | 879 |
| D  | 0.14 | 0.29 | 0.90   | 0.012 | 0.0016 | 0.30 | 0.32 | 0.50 | 0.05 | 0.015 | <0.01 | 0.025 | 0.031 | 0.0002** | 0.0020 | 0.0029 | 745 | 860 |
| E  | 0.14 | 0.30 | 1.29** | 0.015 | 0.0020 | 0.25 | 0.40 | 0.30 | 0.03 | 0.022 | <0.01 | 0.027 | 0.038 | 0.0006   | 0.0022 | 0.0036 | 730 | 847 |

TABLE 4

| Steel No. | $(Cu + Ni) - (M)^2$ | Tensile strength | Results of burst test at −60° C. Size 1 steel tube | Size 2 steel tube |
|---|---|---|---|---|
| A | 0.40 | 1078 | Pass | Pass |
| B | 0.30 | 1160 | Pass | Pass |
| C | −0.14 | 1067 | Fail | Fail |
| D | 0.32 | 1028 | Fail | Fail |
| E | 0.54 | 1022 | Fail | Fail |

Example 3

Steels having the chemical compositions shown in Table 5 were prepared by melting in a converter, and round billets having an outer diameter of 191 mm were manufactured by continuous casting. After the resulting round CC billets were cut to a desired length, the cut pieces were heated to 1250° C. and then subjected to a tube forming process in a hot state by piercing and rolling with a Mannesmann mandrel mill to prepare seamless steel tubes.

Thereafter, these steel tubes were finished to various product sizes by cold drawing in a conventional manner. The dimensions of the steel tubes after the hot tube forming and after the cold drawing are shown in Table 6.

TABLE 5

| Steel No | C | Si | Mn | P | S | Cu | Ni | Cr | Mo | Ti | V | Nb | Al | B | Ca | N |
|---|---|---|---|---|---|---|---|---|---|---|---|---|---|---|---|---|
| F | 0.15 | 0.28 | 0.50 | 0.012 | 0.0024 | 0.22 | 0.24 | 0.30 | 0.00 | 0.024 | 0    | 0.023 | 0.030 | 0.0012 | 0.0021 | 0.0043 |
| G | 0.13 | 0.28 | 0.90 | 0.009 | 0.0018 | 0.31 | 0.15 | 0.35 | 0.01 | 0.026 | 0.03 | 0.025 | 0.029 | 0.0015 | 0.0018 | 0.0050 |
| H | 0.14 | 0.29 | 0.80 | 0.012 | 0.0016 | 0.30 | 0.30 | 0.47 | 0.05 | 0.015 | 0.06 | 0.025 | 0.031 | 0.0015 | 0.0020 | 0.0029 |
| I | 0.14 | 0.29 | 0.90 | 0.012 | 0.0020 | 0.25 | 0.23 | 0.40 | 0.01 | 0.024 | 0    | 0.026 | 0.032 | 0.0001 | 0.0022 | 0.0045 |
| J | 0.12 | 0.29 | 0.82 | 0.012 | 0.0020 | 0.23 | 0.25 | 0.50 | 0.15 | 0.023 | 0    | 0.025 | 0.031 | 0.0006 | 0.0020 | 0.0045 |

The steel tubes which underwent quenching and tempering in this manner were cut to fixed lengths, and a tensile test was carried out in accordance with the tensile test method for metals prescribed by JIS Z 2241 using No. 11 test pieces prescribed by JIS Z 2201 which were taken from the steel tubes.

A fixed length was cut from each steel tube, and the cut piece was cut in the lengthwise direction and opened at room temperature. A Charpy impact test was carried out using a rectangular test piece which was taken from the open tube in the T direction and which had a length of 55 mm, a height of 10 mm, and a width equal to the original wall thickness of the steel tube and into which a 2-mm V-notch was introduced. The relationship of the lowest temperature at which 100% ductile fracture obtained in the Charpy test (indicated in Table 6 as vTrs100) and the results of the tensile test is shown in Table 6.

A short tube having a length of 300 mm was cut from each of the steel tubes which underwent induction hardening and tempering and was formed into the shape of the bottle portion of an accumulator by applying press forming to both ends of the tube so as to form a reduced diameter portion having a length of 25 mm on each end in which the ratio of the diameter of the reduced diameter portion to the diameter of the unreduced portion was 0.6. One end of the tube was sealed by welding, and a closing member through which a high pressure hose could pass was welded to the other end of the tube.

While the resulting test specimen was immersed in ethanol inside a chamber cooled to −60° C., ethanol was charged into the tube through the high pressure hose until the tube was ruptured due to an increased internal pressure, and the mode of failure was observed. Specimens for which the percent area of brittle fracture of the ruptured surface was less than 5% were evaluated as acceptable (indicated by a circle (O) in Table 6), and those in which it was 5% or greater were evaluated as unacceptable (indicated by an X in Table 6).

bursting resistance was obtained even when the ends of a tube underwent cold working.

In contrast, for steel H in which only Ti was outside the range for the steel composition according to the present invention, crystal grains markedly coarsened when heating was performed to greater than 1000° C. As a result, an increase in vTrs100 and a worsening of bursting properties were observed.

TABLE 6

| Run No. | Steel | $(Cu + Ni) - (M)^2$ | Dimensions after hot tube forming OD × WT (mm) OD: outer diameter WT: wall thickness | Dimensions after cold drawing OD × WT (mm) OD: outer diameter WT: wall thickness | % Working ratio in cold drawing | Heating temp (° C.) | Holding time (sec) |
|---|---|---|---|---|---|---|---|
| 1 | F | 0.37 | OD 42.7 × WT 3.10 | OD 30.05 × WT 2.50 | 43.9 | 870 | 2 |
| 2 | F | 0.37 | OD 42.7 × WT 3.10 | OD 30.05 × WT 2.50 | 43.9 | 920 | 5 |
| 3 | F | 0.37 | OD 31.8 × WT 2.70 | OD 25.05 × WT 2.02 | 40.8 | 980 | 2 |
| 4 | F | 0.37 | OD 31.8 × WT 2.70 | OD 25.05 × WT 2.02 | 40.8 | 1000 | 4 |
| 5 | F | 0.37 | OD 42.7 × WT 3.10 | OD 30.05 × WT 2.50 | 43.9 | 1020 | 2 |
| 6 | F | 0.37 | OD 31.8 × WT 2.70 | OD 25.05 × WT 2.02 | 40.8 | 1040 | 5 |
| 7 | F | 0.37 | OD 31.8 × WT 2.50 | OD 25.0 × WT 1.70 | 45.9 | 1045 | 2 |
| 8 | G | 0.33 | OD 42.7 × WT 3.10 | OD 30.05 × WT 2.50 | 43.9 | 870 | 2 |
| 9 | G | 0.33 | OD 42.7 × WT 3.10 | OD 30.05 × WT 2.50 | 43.9 | 920 | 5 |
| 10 | G | 0.33 | OD 31.8 × WT 2.70 | OD 25.05 × WT 2.02 | 40.8 | 980 | 2 |
| 11 | G | 0.33 | OD 31.8 × WT 2.70 | OD 25.05 × WT 2.02 | 40.8 | 1000 | 4 |
| 12 | G | 0.33 | OD 42.7 × WT 3.10 | OD 30.05 × WT 2.50 | 43.9 | 1020 | 2 |
| 13 | G | 0.33 | OD 31.8 × WT 2.70 | OD 25.05 × WT 2.02 | 40.8 | 1040 | 5 |
| 14 | G | 0.33 | OD 31.8 × WT 2.50 | OD 25.0 × WT 1.70 | 45.9 | 1045 | 2 |
| 15 | H | 0.33 | OD 31.8 × WT 2.70 | OD 25.05 × WT 2.02 | 40.8 | 1000 | 4 |
| 16 | H | 0.33 | OD 42.7 × WT 3.10 | OD 30.05 × WT 2.50 | 43.9 | 1020 | 2 |
| 17 | H | 0.33 | OD 31.8 × WT 2.70 | OD 25.05 × WT 2.02 | 40.8 | 1040 | 5 |
| 18 | I | 0.31 | OD 31.8 × WT 2.70 | OD 25.05 × WT 2.02 | 40.8 | 1000 | 4 |
| 19 | I | 0.31 | OD 42.7 × WT 3.10 | OD 30.05 × WT 2.50 | 43.9 | 1020 | 2 |
| 20 | I | 0.31 | OD 31.8 × WT 2.70 | OD 25.05 × WT 2.02 | 40.8 | 1040 | 5 |
| 21 | J | 0.06 | OD 31.8 × WT 2.70 | OD 25.05 × WT 2.02 | 40.8 | — | — |
| 22 | J | 0.06 | OD 31.8 × WT 2.70 | OD 25.05 × WT 2.02* | | 1000 | 5 |
| 23 | J | 0.06 | OD 42.7 × WT 2.70 | OD 25.0 × WT 1.70** | | 1040 | 5 |

| Run No. | Cooling rate in water quenching (° C./sec) | γ grain size | YS (Mpa) | TS (Mpa) | EL (%) | vTrs100 (° C.) | Burst properties at −60° C. |
|---|---|---|---|---|---|---|---|
| 1 | 70 | 12 | 1006 | 1047 | 15.4 | −100 | O |
| 2 | 70 | 12 | 1003 | 1083 | 13.9 | −110 | O |
| 3 | 70 | 12 | 976 | 1057 | 13.3 | −150 | O |
| 4 | 150 | 11 | 1001 | 1103 | 11.4 | −120 | O |
| 5 | 150 | 11 | 1020 | 1099 | 11.6 | −100 | O |
| 6 | 150 | 11 | 960 | 1059 | 14.9 | −100 | O |
| 7 | 150 | 11 | 1011 | 1074 | 11.6 | −100 | O |
| 8 | 70 | 11 | 988 | 1023 | 15.2 | −100 | O |
| 9 | 70 | 12 | 992 | 1025 | 12.2 | −100 | O |
| 10 | 70 | 12 | 976 | 1034 | 13.3 | −120 | O |
| 11 | 150 | 11 | 967 | 1055 | 11.4 | −100 | O |
| 12 | 150 | 11 | 988 | 1073 | 11.6 | −100 | O |
| 13 | 150 | 11 | 960 | 1059 | 14.9 | −100 | O |
| 14 | 150 | 11 | 1000 | 1055 | 10.2 | −100 | O |
| 15 | 150 | 8.3 | 995 | 1045 | 12.3 | −75 | X |
| 16 | 150 | 7.9 | 1000 | 1055 | 13.0 | −70 | X |
| 17 | 150 | 7.5 | 960 | 1059 | 11.5 | −70 | X |
| 18 | 70 | 11 | 975 | 1055 | 12.0 | −70 | X |
| 19 | 70 | 11 | 1000 | 1055 | 13.0 | −70 | X |
| 20 | 70 | 10 | 977 | 1020 | 17.3 | −70 | X |
| 21 | — | — | — | — | — | — | — |
| 22 | 70 | 10 | 1007 | 1055 | 17.3 | −70 | X |
| 23 | 70 | 10 | 1007 | 1055 | 17.3 | −70 | X |

*Softening heat treatment was performed before cold drawing;
**Cold drawing was performed in two steps;
— Cracks developed during cold working, so subsequent steps were not performed Of the steel compositions in accordance with the present invention, with steels F and G which were in preferred ranges, it can be seen that in spite of the wide range of heating conditions, excellent low temperature toughness was stably achieved with vTrs100 of −100° C. or below and excellent With steel I for which only the B content was outside the range for the steel composition according to the present invention, an increase in vTrs100 and a worsening of bursting properties were observed when heating was carried out above 1000° C.

When it was attempted to manufacture a steel tube having an outer diameter of 25 mm and a wall thickness of 2.02 mm or 1.7 mm using steel J containing 0.15% of Mo by applying a combination of hot tube forming and cold drawing with dimensions as employed in Run No. 3 and Run No. 14, cracks developed during cold drawing (see Run No. 21). In Run No. 22, softening heat treatment by soaking for 20 minutes at 620° C. was carried out before cold drawing. In Run No. 23, drawing was carried out in two steps, and softening heat treatment by soaking for 20 minutes at 620° C. was carried out between the drawing steps. This process was not effective.

For steel tubes other than those of Run Nos. 21 and 22, it was possible to complete cold drawing in a single step even though softening heat treatment was not carried out after hot tube forming.

It is clear that by carrying out induction hardening and tempering of a steel having a chemical composition according to the present invention, it is possible to manufacture inexpensively and with high efficiency a high strength seamless steel tube for an airbag system which has excellent low temperature bursting properties when used as an airbag accumulator having a reduced diameter portion.

The invention claimed is:

1. A seamless steel tube for an airbag characterized by having a quenched-and-tempered microstructure and a steel composition which consists of, in mass percent,
C: 0.05-0.20%,
Si: 0.10-0.50%,
Mn: 0.10-1.00%,
P: at most 0.025%,
S: at most 0.005%,
Al: 0.005-0.10%,
Ca: 0.0005-0.0050%,
Nb: 0.005-0.050%,
Ti: 0.005-0.050%,
Cu: 0.01-0.50%,
Ni: 0.01-0.50%,
Cr: 0.01-0.50%,
B: 0.0005-0.0050%,
N: 0.002-0.010%,
and a remainder of Fe and unavoidable impurities,
and which satisfies the following Equation (1),
the tube having a tensile strength of at least 1000 MPa, a yield strength of at least 960 MPa, and a high toughness such that vTrs100 is −100° C. or below:

$$Cu+Ni \geq (M)^2+0.3 \quad (1)$$

wherein M indicates Cr, and the symbols for elements indicate the contents in mass percent of those elements.

2. A steel tube for an airbag as set forth in claim 1 characterized in that the Ti content in mass percent is greater than 0.020% and at most 0.050%.

3. A seamless steel tube for an airbag characterized by having a quenched-and-tempered microstructure and a steel composition which consists of, in mass percent,
C: 0.05-0.20%,
Si: 0.10-0.50%,
Mn: 0.10-1.00%,
P: at most 0.025%,
S: at most 0.005%,
Al: 0.005-0.10%,
Ca: 0.0005-0.0050%,
Nb: 0.005-0.050%,
Ti: 0.005-0.050%,
Cu: 0.01-0.50%,
Ni: 0.01-0.50%,
Cr: 0.01-0.50%,
B: 0.0005-0.0050%,
N: 0.002-0.010%,
wherein the steel composition further consists of Mo: at most 0.01%;
and a remainder of Fe and unavoidable impurities,
and which satisfies the following Equation (1),
the tube having a tensile strength of at least 1000 MPa, a yield strength of at least 960 MPa, and a high toughness such that vTrs100 is −100° C. or below:

$$Cu+Ni \geq (M)^2+0.3 \quad (1)$$

wherein M indicates (Cr+Mo), and the symbols for elements indicate the contents in mass percent of those elements.

4. A seamless steel tube for an airbag characterized by having a quenched-and-tempered microstructure and a steel composition which consists of, in mass percent,
C: 0.05-0.20%,
Si: 0.10-0.50%,
Mn: 0.10-1.00%,
P: at most 0.025%,
S: at most 0.005%,
Al: 0.005-0.10%,
Ca: 0.0005-0.0050%,
Nb: 0.005-0.050%,
Ti: 0.005-0.050%,
Cu: 0.01-0.50%,
Ni: 0.01-0.50%,
Cr: 0.01-0.50%,
B: 0.0005-0.0050%,
N: 0.002-0.010%,
V: 0.02-0.20%,
and a remainder of Fe and unavoidable impurities,
and which satisfies the following Equation (1),
the tube having a tensile strength of at least 1000 MPa, a yield strength of at least 960 MPa, and a high toughness such that vTrs100 is −100° C. or below:

$$Cu+Ni \geq (M)^2+0.3 \quad (1)$$

wherein M indicates Cr, and the symbols for elements indicate the contents in mass percent of those elements.

5. A seamless steel tube for an airbag characterized by having a quenched-and-tempered microstructure and a steel composition which consists of, in mass percent,
C: 0.05-0.20%,
Si: 0.10-0.50%,
Mn: 0.10-1.00%,
P: at most 0.025%,
S: at most 0.005%,
Al: 0.005-0.10%,
Ca: 0.0005-0.0050%,
Nb: 0.005-0.050%,
Ti: 0.005-0.050%,
Cu: 0.01-0.50%,
Ni: 0.01-0.50%,
Cr: 0.01-0.50%,
B: 0.0005-0.0050%,
N: 0.002-0.010%,
V: 0.02-0.20%,
wherein the steel composition further consists of Mo: at most 0.01%,
and a remainder of Fe and unavoidable impurities,
and which satisfies the following Equation (1),
the tube having a tensile strength of at least 1000 MPa, a yield strength of at least 960 MPa, and a high toughness such that vTrs100 is −100° C. or below:

$$Cu+Ni \geq (M)^2+0.3 \quad (1)$$

wherein M indicates (Cr+Mo), and the symbols for elements indicate the contents in mass percent of those elements.

6. A process for manufacturing a seamless steel tube for an airbag characterized in that a seamless steel tube manufactured by hot tube forming of a billet having a steel composition as set forth in claim 1 is subjected to cold working with a working ratio of at least 40% for one step of cold working to form a steel tube having prescribed dimensions, and the steel tube is then straightened, then subjected to quench hardening by heating to at least the $Ac_3$ transformation point by high frequency induction heating followed by rapid cooling, and then subjected to tempering by heating to a temperature of at most the $Ac_1$ transformation point.

* * * * *